(12) United States Patent
Sheng et al.

(10) Patent No.: US 12,615,621 B2
(45) Date of Patent: Apr. 28, 2026

(54) USER EQUIPMENT, BASE STATION, AND WIRELESS COMMUNICATION METHOD

(71) Applicant: JRD COMMUNICATION (SHENZHEN) LTD., Shenzhen (CN)

(72) Inventors: Jia Sheng, Shenzhen (CN); Shahid Jan, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 297 days.

(21) Appl. No.: 18/550,135

(22) PCT Filed: Mar. 12, 2021

(86) PCT No.: PCT/CN2021/080475
§ 371 (c)(1),
(2) Date: Sep. 12, 2023

(87) PCT Pub. No.: WO2022/188155
PCT Pub. Date: Sep. 15, 2022

(65) Prior Publication Data
US 2024/0163846 A1 May 16, 2024

(51) Int. Cl.
*H04W 68/02* (2009.01)

(52) U.S. Cl.
CPC ................................. *H04W 68/025* (2013.01)

(58) Field of Classification Search
CPC ...................................................... H04W 68/025
See application file for complete search history.

(56) References Cited

U.S. PATENT DOCUMENTS

| | | | | |
|---|---|---|---|---|
| 2019/0313475 A1* | 10/2019 | Siomina | ................. | H04W 76/28 |
| 2020/0404617 A1* | 12/2020 | Murray | ............. | H04W 52/0229 |
| 2023/0362889 A1* | 11/2023 | Xu | ...................... | H04W 52/0219 |
| 2023/0421330 A1* | 12/2023 | Faxér | .................... | H04W 24/10 |
| 2024/0080802 A1* | 3/2024 | Wu | ........................ | H04L 5/0094 |

FOREIGN PATENT DOCUMENTS

| | | |
|---|---|---|
| EP | 3412113 B1 | 6/2020 |
| WO | 2019069234 A1 | 4/2019 |

OTHER PUBLICATIONS

VIVO "Paging enhancements for idle/inactive mode UE power saving". 3GPP TSG RAN WG2 #104-e, RI-2100452, Jan. 18, 2021 (Year: 2021).*
NTT DOCOMO et al: "Discussion on paging enhancements", 3GPP Draft; R1-2101622R1-2101622, Jan. 25-Feb. 5, 2021 (Year: 2021).*

(Continued)

*Primary Examiner* — Yuwen Pan
*Assistant Examiner* — Swati Jain
(74) *Attorney, Agent, or Firm* — PV IP PC; Wei Te Chung

(57) ABSTRACT

A wireless communication method performed by a user equipment (UE) in a radio resource control (RRC) idle/inactive state includes being configured, by a base station, with a layer 1 (L1) signaling for paging early indication (PEI) before a paging occasion (PO), wherein the L1 signaling includes a bits' field consisting of two sets, wherein the first set of bits' field indicates information of UE sub-groups for PO and the second set of bits' field indicates an availability indication of a tracking reference signal (TRS).

16 Claims, 10 Drawing Sheets

200

202

Being configured, by a base station, with a shared layer 1 (L1) signaling for paging early indication (PEI) before a next paging occasion (PO), wherein the shared L1 signaling for PEI indicates information of UE groups/sub-groups for paging and an availability of a tracking reference signal (TRS)/channel state information reference signal (CSI-RS) before the next PO

(56)              References Cited

OTHER PUBLICATIONS

Nokia et al: "Evaluation of potential paging enhancements", 3GPP Draft; R1-2101664 Jan. 25-Feb. 5, 2021 (Year: 2021).*
VIVO "Paging enhancements for idle/inactive mode UE power saving". 3GPP TSG RAN WG2 #104-e, RI-82100452, Jan. 18, 2021 (Year: 2021).*
Qualcomm Inc. "Power saving enhancements for paging reception". 3GPP TSG RAN WG2 Meeting #113-e, R2-2100313, Jan. 15, 2021 (Year: 2021).*
International Search Report in International application No. PCT/CN2021/080475,mailed on Aug. 17, 2021.
Written Opinion of the International Search Authority in International application No. PCT/CN2021/080475,mailed on Aug. 17, 2021.
Vivo. "Paging enhancements for idle/inactive mode UE power saving." 3GPP TSG RAN WG1 #104-e, R1-2100452., Jan. 18, 2021(Jan. 18, 2021), section 3.
Qualcomm Inc. "Power saving enhancements for paging reception." 3GPP TSG RAN WG2 Meeting #113-e, R2-2100313., Jan. 15, 2021(Jan. 15, 2021), sections 1-3.
European Search Report in European application No. 21929629.0, mailed on Oct. 31, 2024.
NP1: NTT DOCOMO et al:"Discussion on paging enhancements", 3GPP Draft;R1-2101622.
NP2: Nokia et al:"Evaluation of potential paging enhancements" 3GPP Draft;R1-2101664.

* cited by examiner

200 ⟍

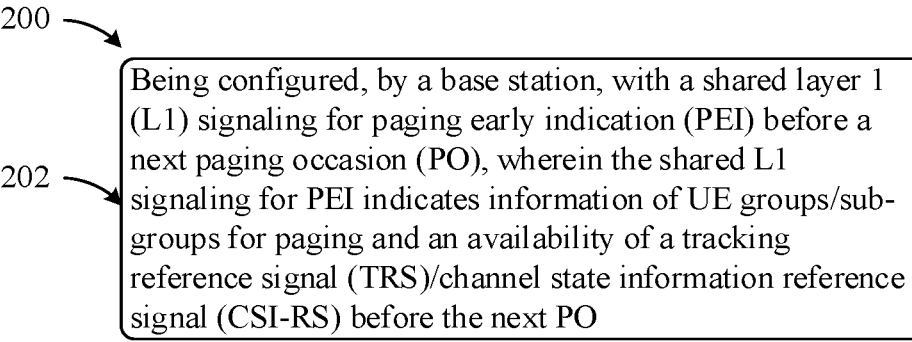

202 ⟍ Being configured, by a base station, with a shared layer 1 (L1) signaling for paging early indication (PEI) before a next paging occasion (PO), wherein the shared L1 signaling for PEI indicates information of UE groups/sub-groups for paging and an availability of a tracking reference signal (TRS)/channel state information reference signal (CSI-RS) before the next PO

302 ⟍ Configuring, to a user equipment (UE), a shared layer 1 (L1) signaling for paging early indication (PEI) before a next paging occasion (PO), wherein the shared L1 signaling for PEI indicates information of UE groups/sub-groups for paging and an availability of a tracking reference signal (TRS)/channel state information reference signal (CSI-RS) before the next PO

FIG. 5

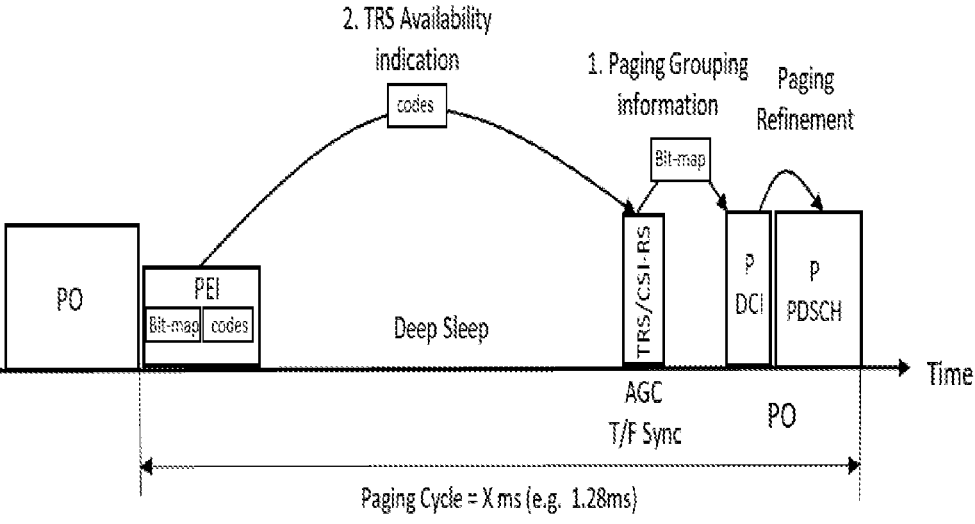

FIG. 6

USER EQUIPMENT, BASE STATION, AND WIRELESS COMMUNICATION METHOD

CROSS REFERENCE TO RELATED APPLICATIONS

This application is a US national phase application based upon an International Application No. PCT/CN2021/080475, filed on Mar. 12, 2021, and entitled "USER EQUIPMENT, BASE STATION, AND WIRELESS COMMUNICATION METHOD". The entire disclosures of the above application are incorporated herein by reference.

BACKGROUND OF DISCLOSURE

1. Field of the Disclosure

The present disclosure relates to the field of wireless communication systems, and more particularly, to a user equipment (UE), a base station, and wireless communication methods, which can provide a UE grouping and tracking reference signal (TRS)/channel state information reference signal (CSI-RS) indication for power saving.

2. Description of the Related Art

Wireless communication systems are widely deployed to provide various types of communication content such as voice, video, packet data, messaging, broadcast, and so on. These wireless communication systems may be capable of supporting communication with multiple users by sharing available system resources (e.g., time, frequency, and power). Examples of such multiple-access systems include fourth generation (4G) systems such as long term evolution (LTE) systems and fifth generation (5G) systems which may be referred to as new radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipments (UEs). A wireless communication network may include a base station that can support communication for a UE. The UE may communicate with the base station via downlink (DL) and uplink (UL). The DL refers to a communication link from the base station to the UE, and the UL refers to a communication link from the UE to the base station.

Power saving techniques play a key role in 5G new radio (NR) system to support low power devices such as industrial wireless sensors, video surveillance, and wearables, etc. To save energy and conserve battery, a UE can use discontinuous reception (DRX) and spend a significant time in a radio resource control (RRC)-idle/inactive mode. During the RRC-idle/inactive mode, the UE stays in a sleeping mode, turns off a radio frequency (RF), and periodically wakes up to monitor a physical downlink control channel (PDCCH) for checking the presence of paging messages. However, decoding paging messages is complex and consumes lots of power resources. Further, a current indication of tracking reference signal (TRS)/channel state information reference signal (CSI-RS) availability and carrying a UE group/sub-group information for paging is considered in a layer 1 (L1)

physical layer design. However, using the L1 physical layer signaling for both availability indication of TRS/CSI-RS and the UE group/sub-group information for paging increases a signaling overhead significantly. There is no clear proposal to explain how to design a signaling for both a TRS/CSI-RS early availability indication and a UE group/sub-group information for paging, and no concrete proposal has been put forward. Therefore, signaling indication mechanisms for both TRS/CSI-RS early availability indication and the UE group/sub-group information for paging are still open issues.

Therefore, there is a need for a user equipment (UE), a base station, and wireless communication methods, which can solve issues in the prior art, provide a UE grouping and TRS/CSI-RS indication for power saving, avoid an unnecessary UE wakeup, avoid a blind detection complexity of the UE for TRS/CSI-RS decoding, reduce a network signaling overhead, reduce a UE TRS/CSI-RS detection complexity and an indication decoding complexity, provide a good communication performance, and/or provide high reliability.

SUMMARY

An object of the present disclosure is to propose a user equipment (UE), a base station, and a wireless communication method, which can solve issues in the prior art, provide a UE grouping and TRS/CSI-RS indication for power saving, avoid an unnecessary UE wakeup, avoid a blind detection complexity of the UE for TRS/CSI-RS decoding, reduce a network signaling overhead, reduce a UE TRS/CSI-RS detection complexity and an indication decoding complexity, provide a good communication performance, and/or provide high reliability.

In a first aspect of the present disclosure, a wireless communication method performed by a user equipment (UE) comprises being configured, by a base station, with a shared layer 1 (L1) signaling for paging early indication (PEI) before a next paging occasion (PO), wherein the shared L1 signaling for PEI indicates information of UE groups/sub-groups for paging and an availability of a tracking reference signal (TRS)/channel state information reference signal (CSI-RS) before the next PO.

In a second aspect of the present disclosure, a wireless communication method performed by a base station comprises configuring, to a user equipment (UE), a shared layer 1 (L1) signaling for paging early indication (PEI) before a next paging occasion (PO), wherein the shared L1 signaling for PEI indicates information of UE groups/sub-groups for paging and an availability of a tracking reference signal (TRS)/channel state information reference signal (CSI-RS) before the next PO.

In a third aspect of the present disclosure, a user equipment (UE) comprises a memory, a transceiver, and a processor coupled to the memory and the transceiver. The processor is configured, by a base station, with a shared layer 1 (L1) signaling for paging early indication (PEI) before a next paging occasion (PO), and the shared L1 signaling for PEI indicates information of UE groups/sub-groups for paging and an availability of a tracking reference signal (TRS)/channel state information reference signal (CSI-RS) before the next PO.

In a fourth aspect of the present disclosure, a base station comprises a memory, a transceiver, and a processor coupled to the memory and the transceiver. The processor is configured to configure, to a user equipment (UE), a shared layer 1 (L1) signaling for paging early indication (PEI) before a next paging occasion (PO), wherein the shared L1 signaling for PEI indicates information of UE groups/sub-groups for paging and an availability of a tracking reference signal (TRS)/channel state information reference signal (CSI-RS) before the next PO.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

FIG. 4 is a flowchart illustrating a wireless communication method performed by a user equipment (UE) according to an embodiment of the present disclosure.

FIG. 5 is a flowchart illustrating a wireless communication method performed by a base station according to an embodiment of the present disclosure.

FIG. 6 is a schematic diagram illustrating an example of a shared signaling concept in a radio resource control (RRC)-idle/inactive mode according to an embodiment of the present disclosure.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Some embodiments of the present disclosure are related to fifth generation (5G) new radio (NR) wireless communication systems. Some embodiments focus on power saving enhancements of a user equipment (UE) in a radio resource control (RRC)-idle/inactive mode and consider a tracking reference signal (TRS)/channel state information reference signal (CSI-RS) instead of using a legacy synchronization signal block (SSB) for automatic gain control (AGC) and time and frequency (T/F) synchronization before paging. More specifically, some embodiments are related to a designing of a shared layer 1 (L1) signaling for early indication of UE groups/sub-groups for paging and TRS/CSI-RS availability, to reduce a network signaling overhead and avoid a blind detection complexity at the UE side.

In an example, a UE performs the following steps to monitor paging: 1. The UE wakes up before a paging occasion. 2. The UE turns on radio frequency (RF) and baseband. 3. AGC and T/F synchronization (referred to as a loop convergence) as well as a serving cell confirmation. 4. The UE attempts a physical downlink control channel (PDCCH) decoding for a downlink control information (DCI) scrambled with a paging-radio network temporary identifier (P-RNTI). 5. If no paging is found, the UE goes to discontinuous reception (DRX). 6. If paging-DCI (P-DCI) is found, depending on a payload, the UE decodes a corresponding physical downlink shared channel (PDSCH). 7. If a UE identity is included in the PDSCH, the UE starts a random access channel (RACH) procedure, otherwise the UE goes back to DRX.

Figure 1:
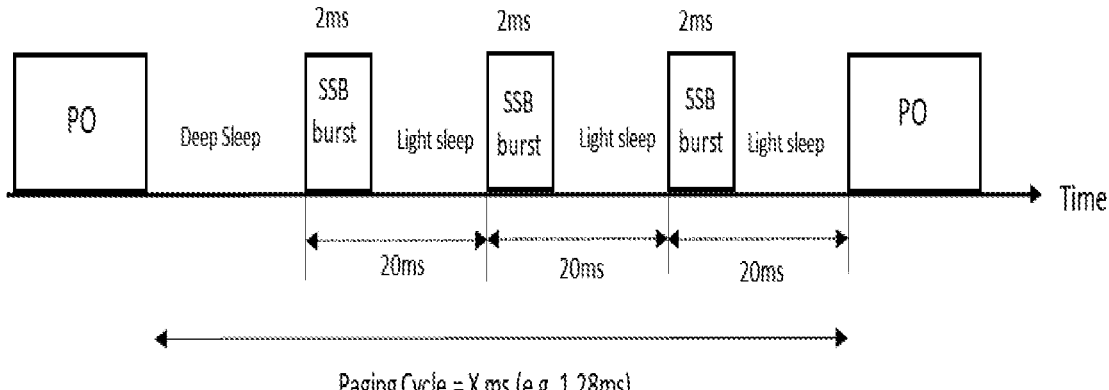
FIG. 1 is a schematic diagram illustrating a synchronization of an idle/inactive mode UE using a synchronization signal block (SSB) burst from a serving cell.

FIG. 1 illustrates a synchronization of an idle/inactive mode UE using a synchronization signal block (SSB) burst from a serving cell. FIG. 1 illustrates that, in some embodiments, a UE in an RRC idle/inactive mode, monitors one paging occasion (PO) per paging cycle for reception of paging scheduling information. Unlike long term evolution (LTE), there is no cell-specific reference signal (CRS)-like always on signal in 5G NR, and a UE in an RRC idle/inactive mode usually needs several SSBs to perform AGC and T/F channel tracking before decoding a paging DCI. The number of SSB bursts required for AGC and time/frequency channel tracking depends on a signal-to-interference-plus-noise ratio (SINR) of a UE serving channel. Reception of three SSBs is the baseline required by the UE before decoding the P-DCI when the UE is in high SINR as illustrated in FIG. 1. After the 3rd SSB is received, the UE can perform accurate AGC, channel estimation, and T/F offset estimation with accurate sampling time from local timing reference, which a frequency drift is calibrated with received signals from the first 2 SSBs. A periodicity of SSB is equal to 20 ms and the UE goes for light sleep after each SSB burst. This mechanism for AGC and T/F synchronization consumes more energy of the UE in the RRC-idle/inactive mode.

Figure 2:
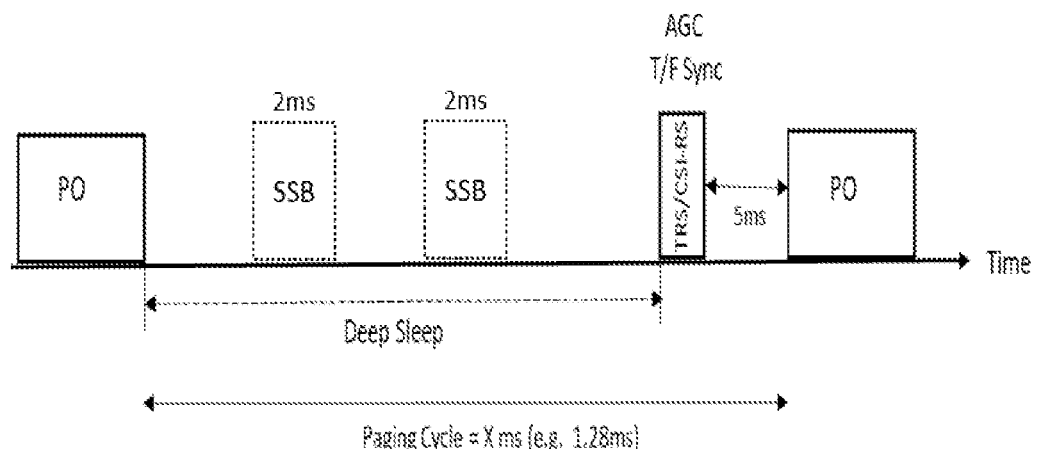
FIG. 2 is a schematic diagram illustrating a synchronization of an idle/inactive mode UE using a tracking reference signal (TRS)/channel state information reference signal (CSI-RS) from a serving cell.

FIG. 2 illustrates a synchronization of an idle/inactive mode UE using a tracking reference signal (TRS)/channel state information reference signal (CSI-RS) from a serving cell. In order to avoid light sleep of a UE, transition of RF and baseband during a paging cycle consumes more energy, and in order to enhance power saving in an RRC-idle/inactive state, 3rd generation partnership project radio access network working group (3GPP RAN WG) has agreed to specify potential TRS/CSI-RS occasion(s) for the idle/inactive mode UE as illustrated in FIG. 2. The TRS/CSI-RS can be used for AGC and T/F synchronization instead of using a legacy SSB in the RRC-idle/inactive state to enhance power saving. In addition, 3GPP RAN WG has approve work item including the following objectives for power saving enhancements of a UE in idle/inactive mode: Specify means to provide potential TRS/CSI-RS occasion(s) available in connected mode to idle/inactive-mode UEs, minimizing system overhead impact.

In 3GPP RAN1 #103-$e$ meeting, it is agreed that a system information block (SIB) signaling will provide a configuration of TRS/CSI-RS occasion(s) for idle/inactive UE(s). As discussed in 3GPP RAN 104-$e$ meeting agreements, an availability of TRS/CSI-RS is informed to an idle/inactive UE based on explicit indication as well as UE sub-groups information for paging is carried in a physical layer design for paging enhancements. However, using L1 physical layer signaling for both availability indication of TRS/CSI-RS and groups/sub-groups information for paging increases a L1 signaling overhead significantly. Therefore, some embodiments of the present disclosure propose a shared L1 signaling overhead concept for early indication of UE sub-groups information for paging as well as prior availability indication of TRS/CSI-RS. Moreover, the shared L1 signaling design is based on sequence based paging early indication (PEI), paging-DCI (P-DCI) based PEI and paging-PDSCH (P-PDSCH) based PEI. In addition, the shared L1 signaling use available bits efficiently, resulting in reduction of a network signaling overhead and avoid a blind detection complexity on the UE side for TRS/CSI-RS detection.

In order to reduce a network L1 signaling overhead, avoid a blind detection complexity of TRS/CSI-RS occasion, and enhance power saving, some embodiments of the present disclosure propose a shared L1 signaling overhead for early indication of UE group/sub-group information for paging and prior indication of TRS/CSI-RS availability. Moreover, some embodiments of the present disclosure also present a hybrid signaling which combines different signaling approaches to carry information of UE groups/sub-groups for paging and indicate TRS/CSI-RS availability. The hybrid L1 signaling can be applied to different scenarios.

Figure 3:
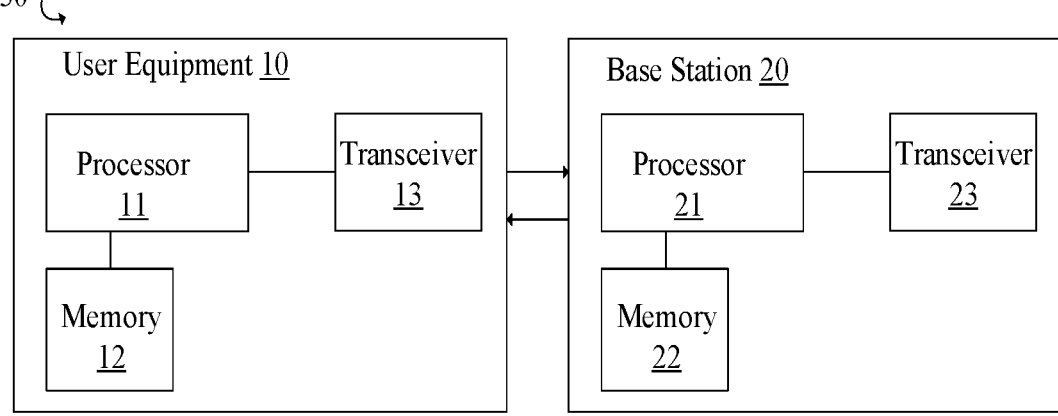
FIG. 3 is a block diagram of one or more user equipments (UEs) and a base station (e.g., gNB) of communication in a communication network system according to an embodiment of the present disclosure.

FIG. 3 illustrates that, in some embodiments, one or more user equipments (UEs) 10 and a base station (e.g., gNB) 20 for communication in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured, by the base station 20, with a shared layer 1 (L1) signaling for paging early indication (PEI) before a next paging occasion (PO) (or called a second PO), and the shared L1 signaling for PEI indicates information of UE groups/sub-groups for paging and an availability of a tracking reference signal (TRS)/channel state information reference signal (CSI-RS) before the next PO. This can solve issues in the prior art, provide a UE grouping and TRS/CSI-RS indication for power saving, avoid an unnecessary UE wakeup, avoid a blind detection complexity of the UE for TRS/CSI-RS decoding, reduce a network signaling overhead, reduce a UE TRS/CSI-RS detection complexity and an indication decoding complexity, provide a good communication performance, and/or provide high reliability.

In some embodiments, the processor 21 is configured to configure, to the user equipment (UE) 10, a shared layer 1 (L1) signaling for paging early indication (PEI) before a next paging occasion (PO) (or called a second PO), wherein the shared L1 signaling for PEI indicates information of UE groups/sub-groups for paging and an availability of a tracking reference signal (TRS)/channel state information reference signal (CSI-RS) before the next PO. This can solve issues in the prior art, provide a UE grouping and TRS/CSI-RS indication for power saving, avoid an unnecessary UE wakeup, avoid a blind detection complexity of the UE for TRS/CSI-RS decoding, reduce a network signaling overhead, reduce a UE TRS/CSI-RS detection complexity and an indication decoding complexity, provide a good communication performance, and/or provide high reliability.

FIG. 4 illustrates a wireless communication method 200 performed by a user equipment (UE) according to an embodiment of the present disclosure. In some embodiments, the method 200 includes: a block 202, being configured, by a base station, with a shared layer 1 (L1) signaling for paging early indication (PEI) before a next paging occasion (PO) (or called a second PO), wherein the shared L1 signaling for PEI indicates information of UE groups/sub-groups for paging and an availability of a tracking reference signal (TRS)/channel state information reference signal (CSI-RS) before the next PO. This can solve issues in the prior art, provide a UE grouping and TRS/CSI-RS indication for power saving, avoid an unnecessary UE wakeup, avoid a blind detection complexity of the UE for TRS/CSI-RS decoding, reduce a network signaling overhead, reduce a UE TRS/CSI-RS detection complexity and an indication decoding complexity, provide a good communication performance, and/or provide high reliability.

FIG. 5 illustrates a wireless communication method 300 performed by a base station according to an embodiment of the present disclosure. In some embodiments, the method 300 includes: a block 302, configuring, to a user equipment (UE), a shared layer 1 (L1) signaling for paging early indication (PEI) before a next paging occasion (PO) (or called a second PO), wherein the shared L1 signaling for PEI indicates information of UE groups/sub-groups for paging and an availability of a tracking reference signal (TRS)/channel state information reference signal (CSI-RS) before the next PO. This can solve issues in the prior art, provide a UE grouping and TRS/CSI-RS indication for power saving, avoid an unnecessary UE wakeup, avoid a blind detection complexity of the UE for TRS/CSI-RS decoding, reduce a network signaling overhead, reduce a UE TRS/CSI-RS detection complexity and an indication decoding complexity, provide a good communication performance, and/or provide high reliability.

It is understood that, in the following FIG. 6 to FIG. 18B, a PO starts from left to right. The left side PO is a first PO, and the right side PO is a next PO or called a second PO. FIG. 6 illustrates an example of a shared signaling concept in a radio resource control (RRC)-idle/inactive mode according to an embodiment of the present disclosure. FIG. 6 illustrates that, some embodiments propose a shared L1 signaling for prior indication of both UE group/sub-group information for paging as well as TRS/CSI-RS availability for AGC and T/F synchronization purposes, to reduce a network signaling overhead, reduce a false paging alarm, avoid a blind detection complexity at the UE side for TRS/CSI-RS decoding, and enhance power saving in an idle/inactive mode UE. A general concept of shared L1 signaling overhead is illustrated in FIG. 6, in which a base station such as a gNB transmits a shared PEI (a sequence based PEI, a P-DCI based PEI, or a P-PDSCH based PEI) prior the PO to the UE. A payload of PEI contains bits' field and it can be partitioned into two sets which perform two functions. Firstly, it indicates the UE group/sub-group information for paging according to bitmapping method explained in later embodiments. Secondly it informs the prior availability indication of TRS/CSI-RS to the UE according to a code indication method explained in later embodiments.

Further, FIG. 6 illustrates that, in some embodiments, stage 1, stage 2, stage 3, and stage 4 are provided. Stage 1: PEI carries information in the form of bitmap to inform UE groups/sub-groups prior a PO for paging. Stage 2: PEI also carries indication in the form of codes to inform UE early about a TRS/CSI-RS availability. Stage 3: In the presence of code transmission, the UE or groups/sub-groups of UEs proceed with TRS/CSI-RS for AGC and T/F synchronization. In the absence of code transmission, the UE or groups/sub-groups of UEs assume an unavailability of TRS/CSI-RS and use a legacy SSB for AGC and T/F synchronization. Stage 4: P-DCI further refines UE groups/sub-groups and indicates the UE groups/sub-groups or UE which needs to proceed with P-PDSCH.

Signaling Types:

Some embodiments explain L1 signaling types and its indication method used for PEI. Since the signaling designed of some embodiments of the present disclosure is L1 physical layer signaling, therefore, a signaling payload contains bits' field, which carries UE group/sub-group information and TRS/CSI-RS availability indication. Moreover, some embodiments of the present disclosure propose two different indications method which are transmitted to UEs prior a PO to informs UE groups/sub-groups for paging as well as TRS/CSI-RS availability. The signaling types considered by some embodiments of the present disclosure are explained below.

Sequence based PEI signaling: In sequence based signaling approach, a dedicated sequence is being transmitted just like the sequence used in narrowband internet-of-things (NB-IoT). This sequence can be used for two purposes: availability indication of TRS/CSI-RS and UE group/sub-group information for paging.

P-DCI based PEI signaling: This signaling is of further two types: First type is a legacy P-DCI based PEI, which uses reserved bits of P-DCI to transmit prior indication of UE group/sub-group information for paging as well as TRS/CSI-RS availability indication for a next paging occasion. Second type is a dedicated P-DCI scrambled with a P-RNTI which transmits a prior indication of UE groups/sub-groups for paging as well as TRS/CSI-RS availability.

P-PDSCH based PEI signaling: P-PDSCH base PEI uses a paging message to transmit a payload containing bits which can be used for prior indication of UE groups/sub-groups for paging as well as TRS/CSI-RS availability.

Indication Method: Two types of indication methods are used in some embodiments of the present disclosure. Bitmap based indication and codes based indication. Bitmap based indication is used to indicate UE group/sub-group information for paging. Code based indication is used to indicate an availability of TRS/CSI-RS.

Bitmap Based Indication:

The bitmap based indication method is used to carry UE group/sub-group information for paging. Where each bit in a payload of the sequence based PEI, the P-DCI based PEI, or the P-PDSCH based PEI is associated to a UE group/sub-group. When the bit is "1", the UE group/sub-group is paged, and when the bit is "0", the UE group/sub-group is not paged. This indication method uses two schemes for mapping, i.e., a one-to-one mapping and a one-to-many mapping.

One-to-One mapping: One-to-one mapping can be used in a case when available B bits in a payload of the sequence based PEI, the P-DCI based PEI, or the P-PDSCH based PEI is equal or greater than the number of the UE groups/sub-groups. For instance, consider 6 UE groups/sub-groups in a network to proceed with paging. The payload of the PEI can use B=6 bits to associate one-to-one correspondence of each bit to a group/sub-group of the UE. An illustration example of one-to-one mapping indication for paging is illustrated in Table 1. One-to-one scheme of bitmap based indication is easy to execute but it increases the size of payload in case if the number of UE groups in the network are more.

TABLE 1

One-to-one bitmap based indication for
group/sub-group paging information

| Bits B = 6 (110101) | Group/Sub-group indication |
|---|---|
| 1 | Group 0 (paging) |
| 1 | Group 1 (paging) |
| 0 | Group 2 (non- paging) |
| 1 | Group 3 (paging) |
| 0 | Group 4 (non-paging) |
| 1 | Group 5 (paging) |

Many-to-one Mapping: In one-to-many mapping scheme of bitmap indication method, each B bit in the sequence based PEI, the P-DCI based PEI, or the P-PDSCH based PEI is associated to indicate multiple groups/sub-groups for paging. For example, consider 8 groups/sub-groups of UEs to proceed with paging, and available bits are B=4. Each reserved bit from payload of bits' field is associated to more than one group/sub-group. The illustration example of this mapping is illustrated in Table 2, where 1 is associated to paging and 0 is associated to non-paging.

TABLE 2

One-to-many bitmap based indication for
group/sub-group paging information

| Bits B = 4 (1100) | 8 groups/sub-groups indication |
|---|---|
| 1 | Group 0, Group 1 (paging) |
| 1 | Group 2, Group 3 (paging) |
| 0 | Group 4, Group 5 (non-paging) |
| 0 | Group 6, Group7 (non-paging) |

Code Based Indication:

This code based indication method of L1 signaling is used to inform a UE or groups/sub-groups of UEs about an availability of TRS/CSI-RS. In this indication method, different codes of B bits in a payload of the sequence based PEI, the P-DCI based PEI, or the P-PDSCH based PEI are sent to the UE, to inform the availability of different TRS/CSI-RS occasions. This indication method is only used to inform the UE about the availability of TRS/CSI-RS. For instance, consider 4 TRS s/CSI-RS s available in a network. A base station such as a gNB can use only two bits B=2 from a bit's field in a payload of the sequence based PEI, the P-DCI based PEI or the P-PDSCH based PEI and make M=4 codes, in which each code is associated to indicate different TRSs/CSI-RSs, as illustrated in Table 3. This indication method is very beneficial due to its multiple choices of codes by using a smaller number of bits and it helps the UE to differentiate the indication of TRS/CSI-RS availability from UE group/sub-group information for paging in shared L1 signaling. Moreover, transmission of codes indicates an availability of TRS/CSI-RS and absence of codes indicates an unavailability of TRS/CSI-RS. In the absence of codes transmission, the UE or groups/sub-groups of UEs will assume that there is no TRS/CSI-RS and perform AGC and T/F synchronization by using a legacy SSB burst.

TABLE 3

Code based indication for TRS/CSI-RS availability

| Codes M of B bits in PEI | TRS availability indication |
|---|---|
| 00 | TRS 0 |
| 01 | TRS 1 |
| 10 | TRS 2 |
| 11 | TRS 3 |

Signaling Techniques:

Some embodiments propose different combinations of shared L1 signalings for prior indication of UE group/sub-group information for paging and TRS/CSI-RS availability. In addition, some embodiments also propose some independent signaling, hybrid signaling, and its possible combinations which can be applied to different scenarios.

Sequence Based PEI Signaling for Group/Sub-Group Paging and TRS/CSI Availability Indication In some embodiments, sequence based PEI is sent prior a PO to UEs which perform two functions. Firstly, it indicates UE group/sub-group information for paging and secondly it informs an availability of TRS/CSI-RS. Sequence based PEI has three possible combinations which are explained in below in details.

Joint Sequence Based PEI Signaling for Indication of Group/Sub-Group Paging and TRS/CSI-RS Availability In some embodiments, in this signaling method, a shared sequence based PEI is sent prior a PO to UEs for indication of both group/sub-group information for paging and TRS/CSI-RS availability. A payload of shared sequence based PEI use bits' field which can be partitioned into two sets. The first set of bits' field uses bitmapping to indicate groups/sub-group for paging according to the indication method explained in the above embodiments. The second set of bits' field uses different combination of codes to indicate the availability of TRS/CSI-RS according to the indication method explained in the above embodiments. An illustrative example of this method is illustrated in FIG. 7.

Figure 7:
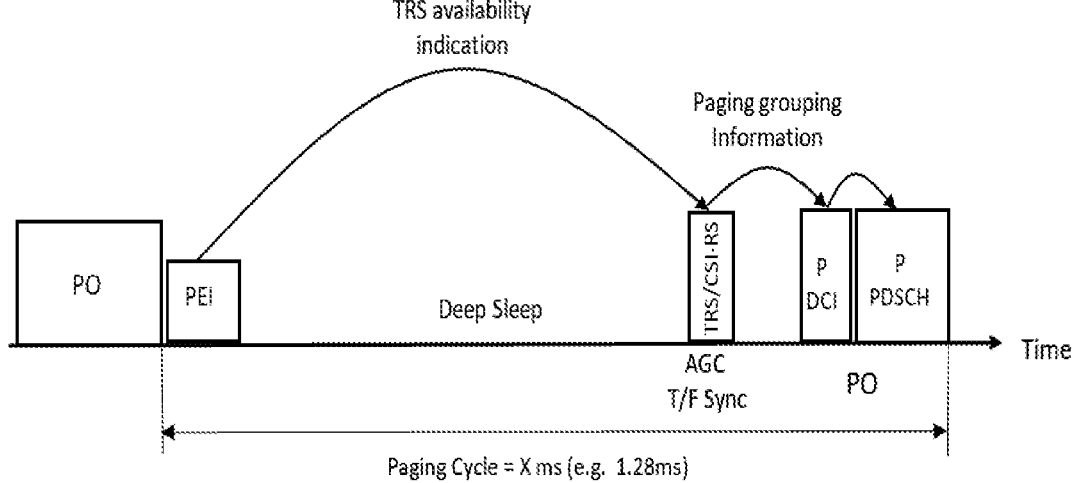
FIG. 7 is a schematic diagram illustrating an example of a joint sequence based paging early indication (PEI) for prior indication of UE groups/sub-groups for paging and TRS/CSI-RS availability according to an embodiment of the present disclosure.

FIG. 7 illustrates an example of a joint sequence based paging early indication (PEI) for prior indication of UE groups/sub-groups for paging and TRS/CSI-RS availability according to an embodiment of the present disclosure. For instance, consider 4 groups/sub-groups of a UE for paging. A combined sequence based PEI signal is being transmitted to all 4 groups/sub-groups and the combined sequence based PEI signal carries both UE group/sub-group information for paging and TRS/CSI-RS availability indication. The signal uses 6 bits, which can be partitioned into two sets. The first set uses 4 bits to indicate group/sub-groups for paging with the same rules i.e., bit "1" indicates paging and bit "0" indicates no-paging according to the indication method explained in the above embodiments. The second set uses the remaining two bits and it can make 4 different codes. Each code indicates the availability of TRS/CSI-RS for AGC and T/F synchronization. It should be noted that, the availability of TRS/CSI-RS depends on a connected UE in a network. In case, if there is no connected UE in the network, TRS/CSI-RS will be unavailable. Here some embodiments assume, in the presence of TRS/CSI-RS codes will be transmitted to UEs or groups/sub-groups of UEs, and in the absence of TRS/CSI-RS in the network, no codes will be transmitted to UEs or groups/sub-groups of UEs. Thus, in the presence of codes, the UE or groups/sub-groups of UEs will assume the availability of TRS/CSI-RS and in the absence of codes, the UE or groups/sub-groups of UEs will assume the unavailability of TRS/CSI-RS. Moreover, when the TRS/CSI-RS is not available in the network, the UE will use a legacy SSB burst for AGC and T/F channel synchronization. The main advantage of this embodiment is that, it uses few bits to perform two functions. Firstly, it indicates the UE group/sub-group information for paging. Secondly, it indicates the availability/unavailability of TRS/CSI-RS which results in reduction of the network L1 signaling overhead.

In addition, FIG. 7 illustrates that, in some embodiments, the sequence based PEI can be transmitted right after a PO. In other words, a PRB used by a base station such as a gNB to transmit the sequence based PEI can start with X slot gap in time domain with the PO, where {X=0, 1, 2 . . . } slots gap. X is equal to 0 or an integer greater than 0. The lower the slot gap, the better is the power saving. With higher slot gap, UE will go to light sleep for X slots and wake up again to decode the sequence based PEI which consumes more power on the UE side.

Figure 8:
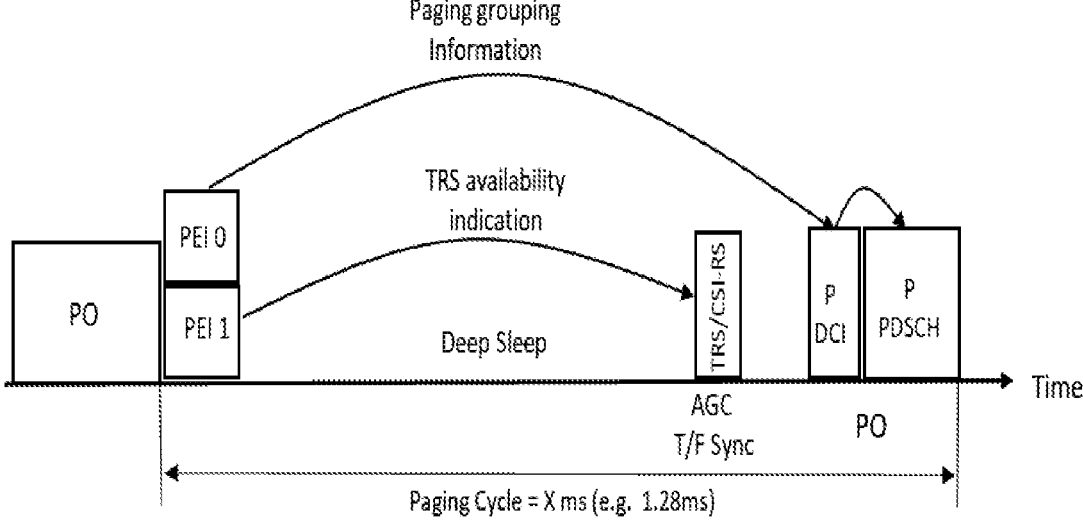
FIG. 8 is a schematic diagram illustrating an example of an independent sequence based PEI for indication of UE groups/sub-groups and TRS/CSI-RS availability according to an embodiment of the present disclosure.

Independent sequence based PEI signaling for group/sub-group paging and TRS/CSI-RS availability indication:

FIG. 8 illustrates an example of an independent sequence based PEI for indication of UE groups/sub-groups and TRS/CSI-RS availability according to an embodiment of the present disclosure. In some embodiments, an independent sequence based PEI is transmitted in FDMed fashion, in which a separate sequence based PEI signaling is associated to UE group/sub-group information for paging and availability indication of TRS/CSI-RS. An illustrative example of this method is illustrated in FIG. 8, where 2 sequence based PEIs (PEI0 and PEI1) are transmitted simultaneously. PEI0 is associated to transmit the UE group/sub-group information for paging and PEI1 is associated to transmit the TRS/CSI-RS availability indication. For instance, consider 8 groups of UEs for paging. Two independent sequence based PEI signals are being transmitted, in which PEI0 is used for UE group/sub-group indication and PEI1 is used to transmit the availability indication of TRS/CSI-RS. PEI0 signal uses 8 bits to transmit the paging information according to the indication method explained in the above embodiments. Number of PEI1 bits depends on the available number of TRS/CSI-RS in the network. For instance, 8 number of TRS s/CSI-RS are available in the network, PEI1 will use only 3 bits to transmit 8 different codes according to the indication method explained in the above embodiments. Each code indicates the availability of TRS/CSI-RS for AGC and T/F synchronization. Since the availability of TRS/CSI-RS depends on a connected UE in the network. Thus, in case of unavailability of TRS/CSI-RS, no code will be transmitted. In the absence of code, the UE or groups/sub-groups of UEs will assume the unavailability of TRS/CSI-RS and use a legacy SSB burst for AGC and T/F channel synchronization.

Figure 9:
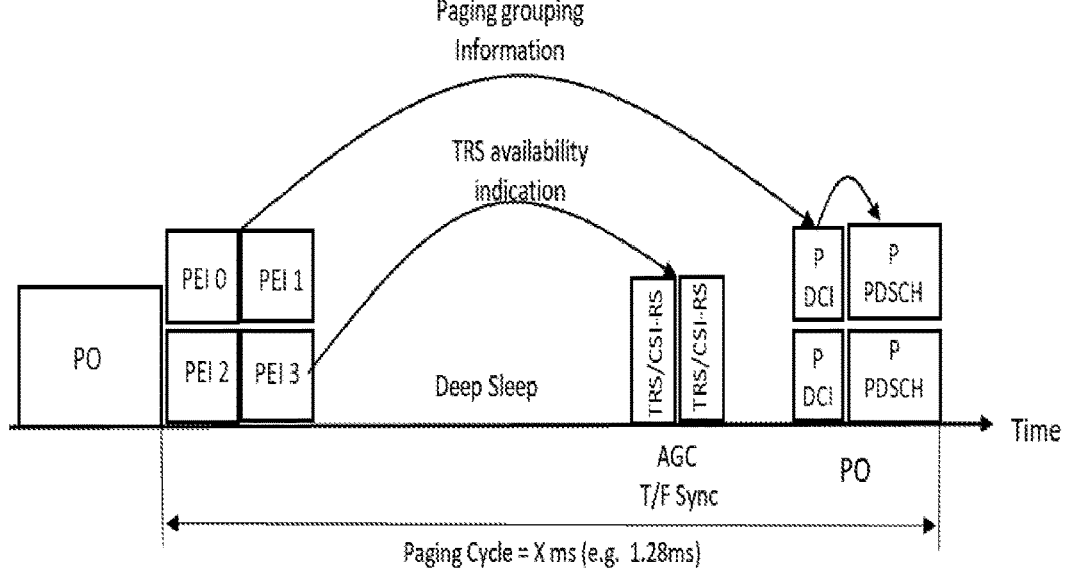
FIG. 9 is a schematic diagram illustrating an example of a multiple sequence based PEI for prior indication of UE groups/sub-groups for paging and TRS/CSI-RS availability according to an embodiment of the present disclosure.

FIG. 9 illustrates an example of a multiple sequence based PEI for prior indication of UE groups/sub-groups for paging and TRS/CSI-RS availability according to an embodiment of the present disclosure. Similarly, multiple PEI resources can be associated to different UE groups/sub-groups as well as TRS/CSI-RS availability. An illustrative example of this method is illustrated in FIG. 9, where 2 PEI (PEI0 and PEI1) are associated to a UE group/sub-group indication while two PEIs (PEI2 and PEI3) are associated for indication of TRS/CSI-RS availability. Using multiple PEIs has advantages of availability of more bits for UE group/sub-group indication as well as TRS/CSI-RS availability indication. However, using more PEIs will increase network L1 signaling overheads. It is worthy to note that the PEI used for the UE group/sub-group indication can be reused for TRS/CSI-RS availability indication.

P-DCI based PEI signaling for group/sub-group paging indication and TRS/CSI-RS availability indication:

In some embodiments, P-DCI based PEI can be used to transmit group/sub-group paging indication as well as TRS/CSI-RS availability indication. This approach can use two methods. The first method uses reserved bits of a legacy P-DCI in a PO to transmit a group/sub-group indication and a TRS/CSI-RS indication for a next PO. The second method transmits a dedicated P-DCI based PEI to indicate UE groups/sub-groups and TRS/CSI-RS availability. Both methods are explained below.

Figure 10:
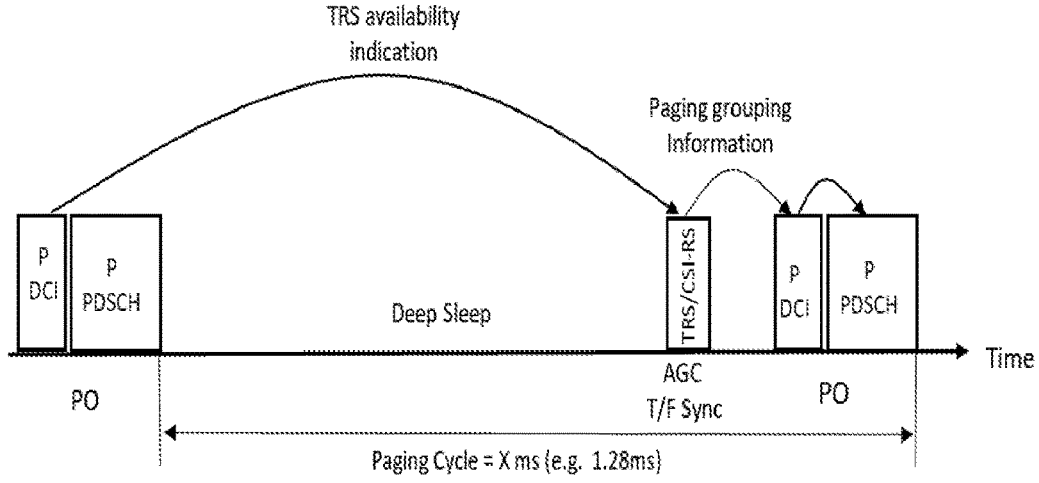
FIG. 10 is a schematic diagram illustrating an example of a joint paging-downlink control information (P-DCI) PEI for prior indication of UE groups/sub-groups for a next paging occasion (PO) and TRS/CSI-RS availability according to an embodiment of the present disclosure.

Legacy P-DCI of PO Based PEI:

FIG. 10 illustrates an example of a joint paging-downlink control information (P-DCI) PEI for prior indication of UE groups/sub-groups for a next paging occasion (PO) and TRS/CSI-RS availability according to an embodiment of the present disclosure. The main advantage of a legacy P-DCI of a PO based PEI signaling approach is to use reserved bits of already existing P-DCI without introducing any extra L1 signaling which reduces a network L1 signaling overhead. As a legacy P-DCI has 6 reserved bits and it can be used to early indicate the UE group/sub-group information for paging as well as indicate the TRS/CSI-RS availability for a next PO. The illustrative example of this approach is illustrated in FIG. 10, where reserve bits of the legacy P-DCI is partitioned into two sets. The first set of bits performs a group/sub-group indication according to the bitmapping method explained in the above embodiments. The second set performs an early indication of TRS/CSI-RS availability as explained in the above embodiments. An illustrative example of this method is shown in FIG. 10. For instance, consider 4 UE groups/sub-groups to proceed with paging. The reserved 6 bits of the P-DCI can be partitioned into two sets. The first set i.e., first four bits is used for group/sub-group indication and the second set i.e., the remaining two bits can transmit as a different combination of codes to indicate the availability of TRS/CSI-RS. In absence of codes, the UE or groups/sub-groups of UEs will assume the unavailability of TRS/CSI-RS and perform AGC and T/F synchronization by using the legacy method of SSB.

Figure 11:
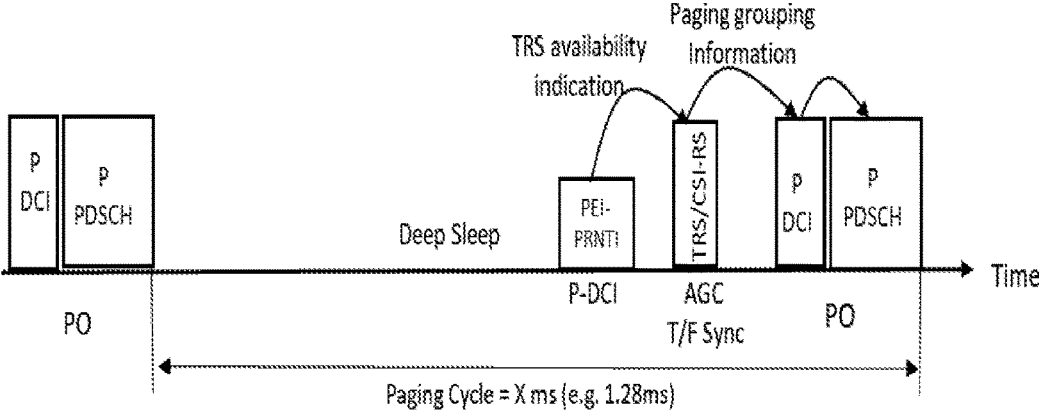
FIG. 11 is a schematic diagram illustrating an example of a joint dedicated P-DCI based PEI for prior indication of UE groups/sub-groups and TRS/CSI-RS availability according to an embodiment of the present disclosure.

Dedicated P-DCI Based Signaling:

FIG. 11 illustrates an example of a joint dedicated P-DCI based PEI for prior indication of UE groups/sub-groups and TRS/CSI-RS availability according to an embodiment of the present disclosure. In some embodiments, a dedicated P-DCI scrambled with a PRNTI transmits a prior indication of both UE group/sub-group information for paging as well as TRS/CSI-RS availability indication. The bits transmitted in a dedicated P-DCI can be partitioned into two sets. The first set indicates UE groups/sub-groups for paging according to the method explained in the above embodiments. The second set indicates TRS/CSI-RS availability by transmitting codes according to the methods explained in the above embodiments. In absence of codes, the UE or groups/sub-groups of UEs will assume that there is no TRS/CSI-RS available and use the legacy method of SSB for AGC and T/F synchronization purposes. An illustrative example of this method is illustrated in FIG. 11.

Figure 12:
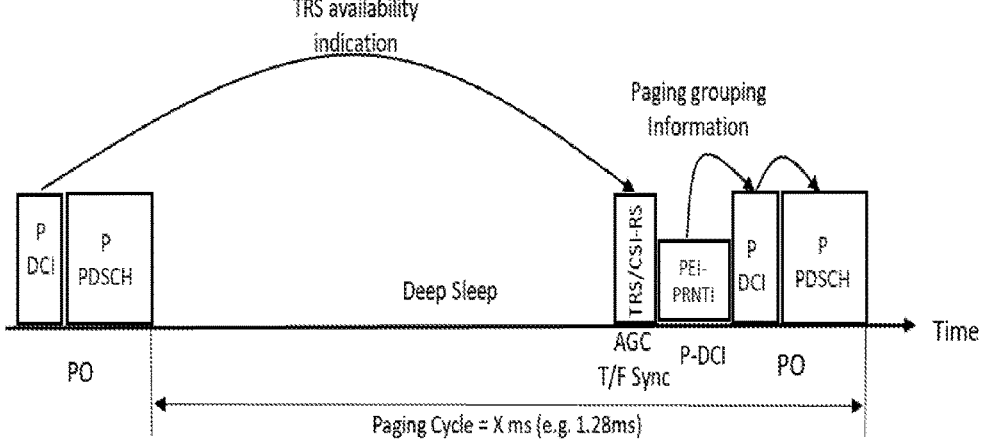
FIG. 12 is a schematic diagram illustrating an example of a legacy P-DCI of a PO and a dedicated P-DCI based PEI for prior indication of UE groups/sub-groups and TRS/CSI-RS availability according to an embodiment of the present disclosure.

FIG. 12 illustrates an example of a legacy P-DCI of a PO and a dedicated P-DCI based PEI for prior indication of UE groups/sub-groups and TRS/CSI-RS availability according to an embodiment of the present disclosure. Similarly, a hybrid approach of a legacy P-DCI of a PO and a dedicated P-DCI scrambled with a P-RNTI can also be used to transmit a TRS/CSI-RS availability indication and a UE group/sub-group for paging indication respectively. An illustrative example of this method is illustrated in FIG. 12. This signaling method can be used in a scenario where the number of UE groups/sub-groups for paging is high.

Figure 13A:
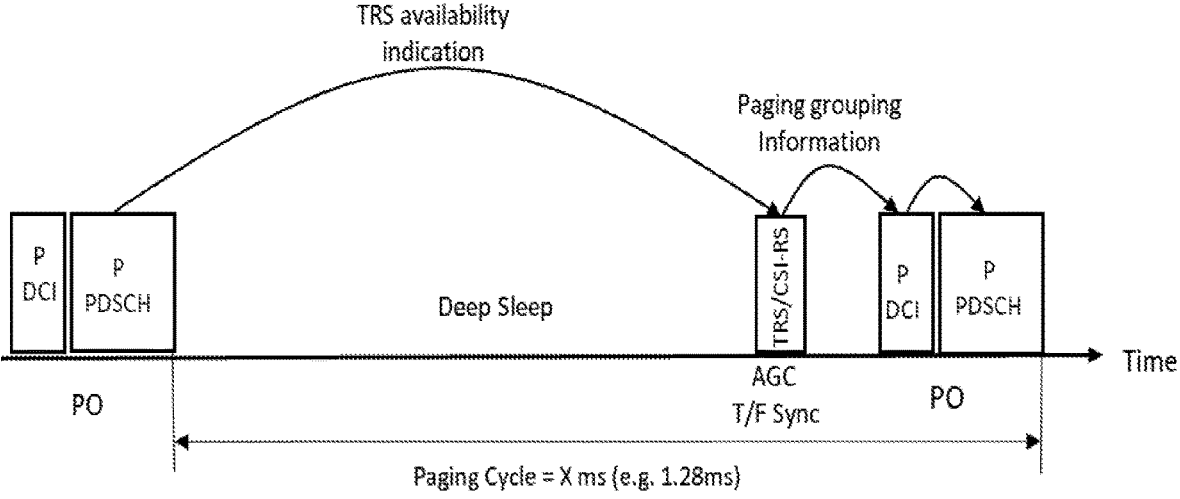
FIG. 13A is a schematic diagram illustrating an example of a joint paging-physical downlink shared channel (P-PDSCH) based PEI for prior indication of UE groups/sub-groups and TRS/CSI-RS availability according to an embodiment of the present disclosure.

Paging PDSCH Based PEI Signaling for Group/Sub-Group and TRS/CSI-RS Availability Indication:

FIG. 13A illustrates an example of a joint paging-physical downlink shared channel (P-PDSCH) based PEI for prior indication of UE groups/sub-groups and TRS/CSI-RS availability according to an embodiment of the present disclosure. In some embodiments, a paging PDSCH, i.e., paging message, based PEI is transmitted prior a PO to a UE, which carries an indication of both UE groups/sub-groups for paging and TRS/CSI-RS availability for a next PO. An illustrative example of this method is illustrated in FIG. 13A, where paging message carries a shared PEI which is partitioned into two sets. The first set informs UE groups/sub-groups for paging according to the bitmap method explained in the above embodiments. The second set transmits codes to indicate the availability of TRS/CSI-RS according to the code based indication method explained in the above embodiments. The main advantages of P-PDSCH based PEI is that, the UE receives a payload of PEI within resources allocated for P-PDSCH which reduces UE complex monitoring for decoding of PEI and resulting into low power consumption for PEI decoding.

Figure 13B:
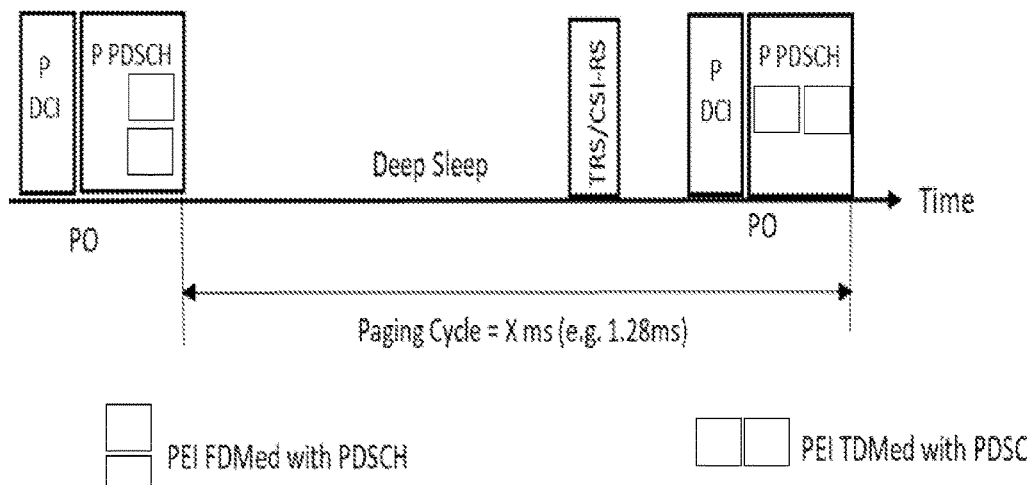
FIG. 13B is a schematic diagram illustrating an example of a P-PDSCH based PEI transmission according to an embodiment of the present disclosure.

FIG. 13B illustrates an example of a P-PDSCH based PEI transmission according to an embodiment of the present disclosure. In the present disclosure, some embodiments propose two modes of P-PDSCH based PEI payload transmission. In the first mode, a PEI payload can be FDMed with P-PDSCH for transmission. In other words, a PRB used by a gNB for transmission of P-PDSCH based PEI can be multiplexed with the P-PDSCH in frequency domain while using the same OFDM symbol of a slot or the same slot of a frame as illustrated in FIG. 13B. This mode of transmission makes a UE to receive the payload simultaneously in the same OFDM symbol of a slot or the same slot of a frame. In the second mode, the payload of the PEI can be transmitted in TDMed fashion with P-PDSCH while using Y OFDM symbols of a slot or Y slots of a frame. Where $Y=\{0, 1, 2, 3, 4, 5, 6, 7, 8, 9, 10, 11, 12, 13\}$ OFDM symbols/slots. Y is equal to 0 or an integer which ranges between 1 and 13. An illustrative example of P-PDSCH based PEI transmission is illustrated in FIG. 10B.

Hybrid L1 Signaling for UE Group/Sub-Group Paging and TRS/CSI-RS Availability Indication:

Some embodiments propose hybrid PEI approaches consisting of a sequence based PEI, a P-DCI based PEI, and a P-PDSCH based PEI. The main advantages of hybrid L1 signaling is that reduced capability (Redcap) UEs in a network can benefit from it due to a low complexity sequence based PEI and high capacity of the P-DCI based PEI. Moreover, the hybrid L1 signaling can be used in those scenarios where the number of UE groups/sub-groups for paging are larger in the network and the payload of shared signaling becomes very heavy.

Figure 14A:
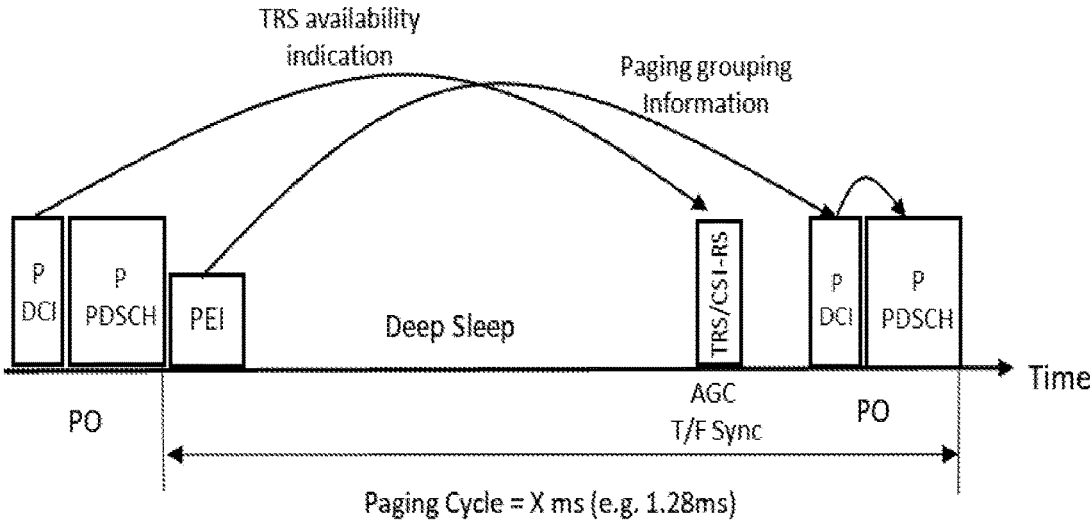
FIG. 14A is a schematic diagram illustrating an example of a hybrid L1 signaling of legacy P-DCI and sequence base PEI for prior indication of TRS/CSI-RS availability and UE groups/sub-groups for paging according to an embodiment of the present disclosure.
Figure 14B:
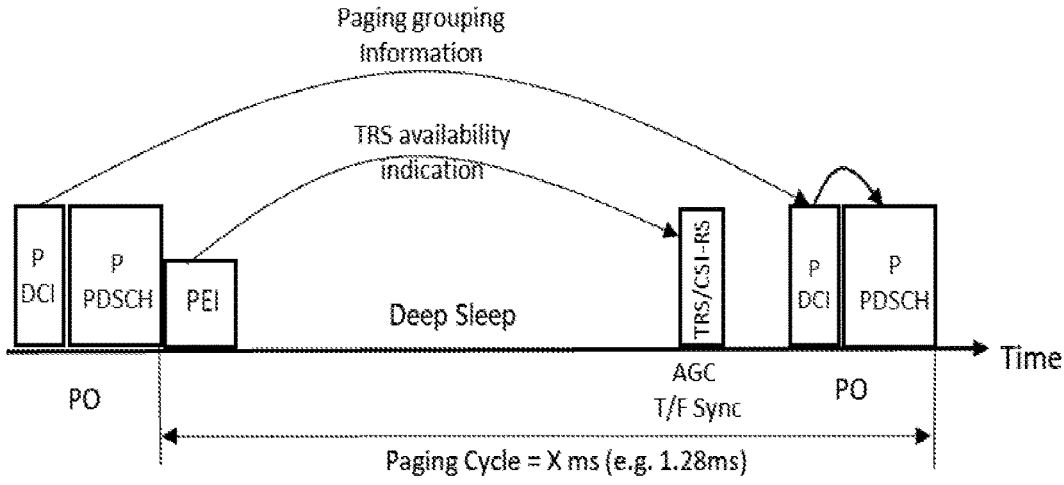
FIG. 14B is a schematic diagram illustrating an example of a hybrid L1 signaling of legacy P-DCI and sequence base PEI for prior indication of UE groups/sub-groups for paging and TRS/CSI-RS availability according to an embodiment of the present disclosure.

Hybrid L1 Signaling of P-DCI and Sequence Based PEI:

FIG. 14A illustrates an example of a hybrid L1 signaling of legacy P-DCI and sequence base PEI for prior indication of TRS/CSI-RS availability and UE groups/sub-groups for paging according to an embodiment of the present disclosure. FIG. 14B illustrates an example of a hybrid L1 signaling of legacy P-DCI and sequence base PEI for prior indication of UE groups/sub-groups for paging and TRS/CSI-RS availability according to an embodiment of the present disclosure. In some embodiments, a hybrid L1 signaling comprising a legacy P-DCI based PEI and a sequence based PEI is being transmitted to carry UE group/sub-group information for paging according to the indication method explained in the above embodiments and prior inform a UE about TRS/CSI-RS availability according to the indication method explained in the above embodiments. This L1 hybrid signaling method has two possible combinations. In the first combination, the legacy P-DCI based PEI carries TRS/CSI-RS availability indication and the sequence based PEI carries group/sub-group information for paging as shown in FIG. 14A. In the second combination, the legacy P-DCI based PEI carries a UE group/sub-group information for paging and the sequence based PEI carries a TRS/CSI-RS availability indication as shown in FIG. 14B.

Figure 15A:
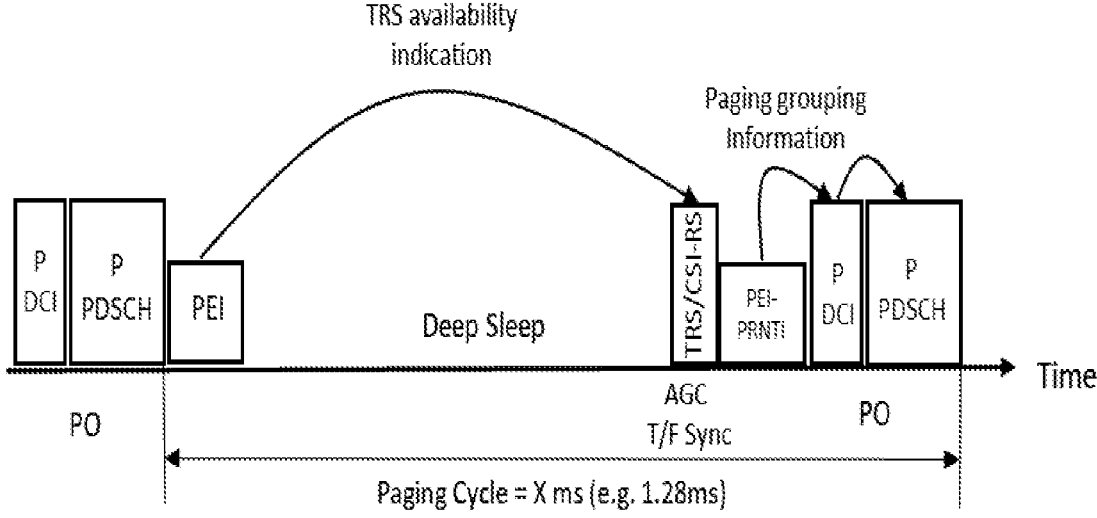
FIG. 15A is a schematic diagram illustrating an example of a hybrid L1 signaling of sequence base and dedicated P-DCI based PEI for prior indication of TRS/CSI-RS availability and UE groups/sub-groups for paging according to an embodiment of the present disclosure.
Figure 15B:
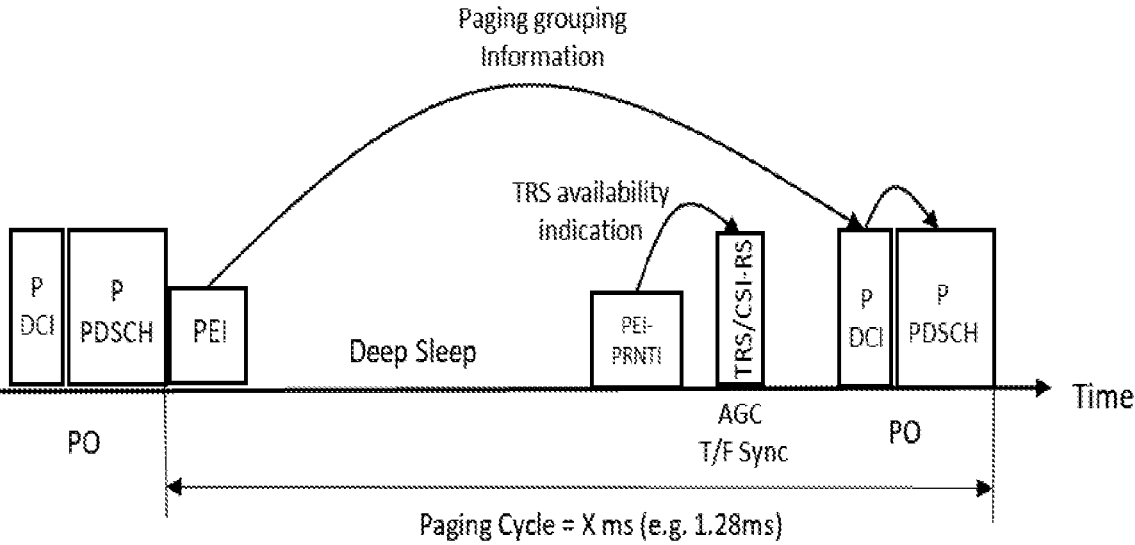
FIG. 15B is a schematic diagram illustrating an example of a hybrid L1 signaling of sequence base and dedicated P-DCI based PEI for prior indication of UE groups/sub-groups for paging and TRS/CSI-RS availability according to an embodiment of the present disclosure.

FIG. 15A illustrates an example of a hybrid L1 signaling of sequence base and dedicated P-DCI based PEI for prior indication of TRS/CSI-RS availability and UE groups/sub-groups for paging according to an embodiment of the present disclosure. FIG. 15B illustrates an example of a hybrid L1 signaling of sequence base and dedicated P-DCI based PEI for prior indication of UE groups/sub-groups for paging and TRS/CSI-RS availability according to an embodiment of the present disclosure. Similarly, a hybrid L1 signaling comprising a sequence based PEI and a dedicated P-DCI based PEI can be transmitted prior a PO to inform UE's group/sub-group information for paging according to the indication method explained in the above embodiments and availability of TRS/CSI-RS according to the indication method explained in the above embodiments. This L1 hybrid signaling method has also two possible combinations. In the first combination, the sequence based PEI carries a TRS/CSI-RS availability indication and the dedicated P-DCI based PEI carries a UE group/sub-group information for paging as shown in FIG. 15A. In the second combination, the sequence based PEI carries the UE group/sub-group information for paging and the dedicated P-DCI based PEI carries the TRS/CSI-RS availability indication as shown in FIG. 15B.

Figure 16A:
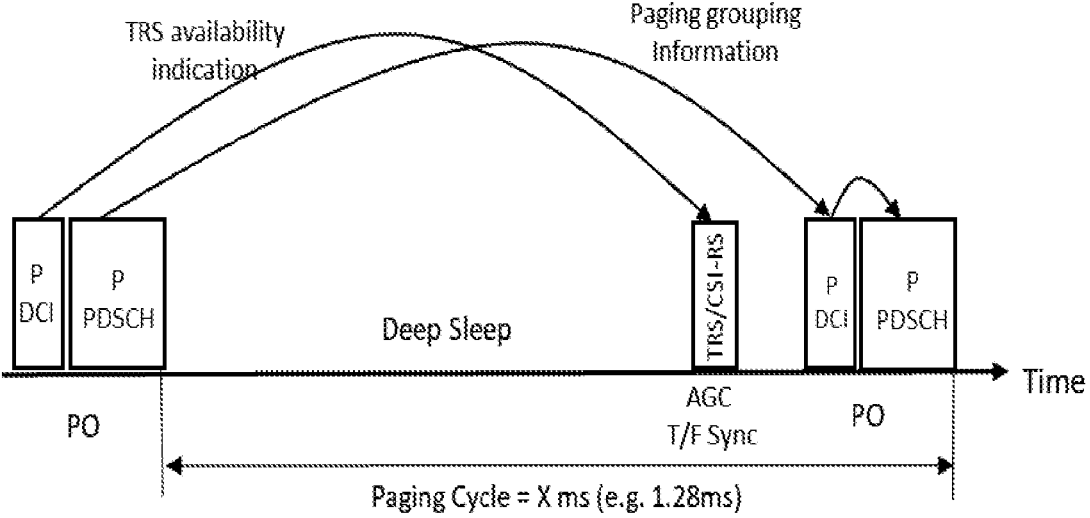
FIG. 16A is a schematic diagram illustrating an example of a hybrid L1 signaling of legacy P-DCI and P-PDSCH base PEI for prior indication of TRS/CSI-RS availability and UE groups/sub-groups for paging according to an embodiment of the present disclosure.
Figure 16B:
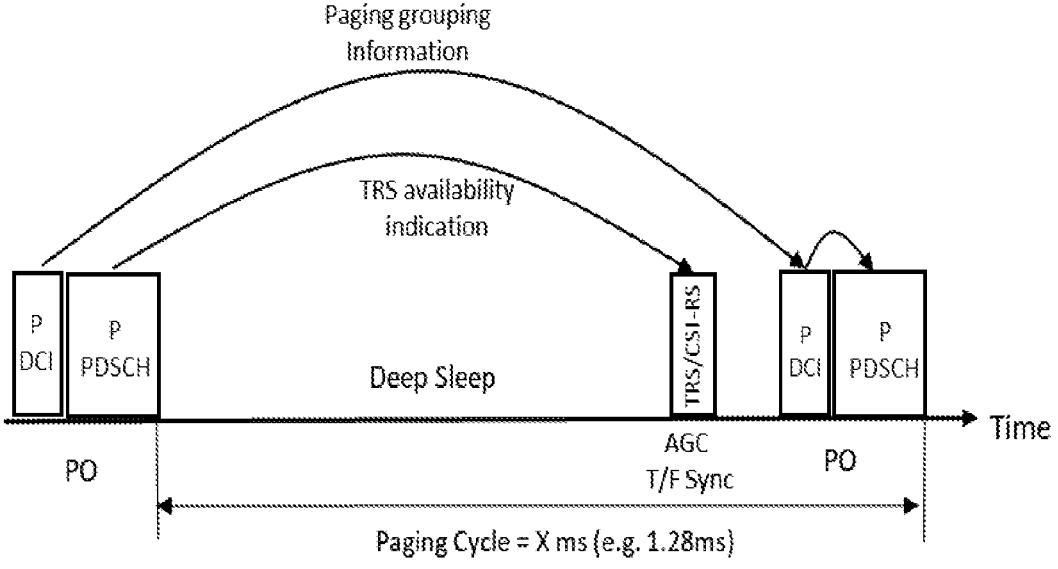
FIG. 16B is a schematic diagram illustrating an example of a hybrid L1 signaling of legacy P-DCI and P-PDSCH base PEI for prior indication of UE groups/sub-groups for paging and TRS/CSI-RS availability according to an embodiment of the present disclosure.

Hybrid Signaling of P-DCI and P-PDSCH Based PEI:

FIG. 16A illustrates an example of a hybrid L1 signaling of legacy P-DCI and P-PDSCH base PEI for prior indication of TRS/CSI-RS availability and UE groups/sub-groups for paging according to an embodiment of the present disclosure. FIG. 16B illustrates an example of a hybrid L1 signaling of legacy P-DCI and P-PDSCH base PEI for prior indication of UE groups/sub-groups for paging and TRS/CSI-RS availability according to an embodiment of the present disclosure. In some embodiments, a hybrid L1 signaling comprising a P-PDSCH based PEI and a P-DCI based PEI is being transmitted prior a PO to inform UE's group/sub-group information for paging according to the indication method explained in the above embodiments and TRS/CSI-RS availability according to the indication method explained in the above embodiments. This L1 hybrid signaling method has two possible combinations. In the first combination, the legacy P-DCI based PEI carries an availability indication of TRS/CSI-RS, and the P-PDSCH based PEI carries group/sub-group information for paging as shown in FIG. 16A. In the second combination, the legacy P-DCI based PEI carries group/sub-group information for paging and the P-PDSCH based PEI carries an indication of TRS/CSI-RS availability as shown in FIG. 16B. The advantaged of this hybrid method is that it uses the existing resources and there is no extra L1 signaling for indication purposes.

Figure 17A:
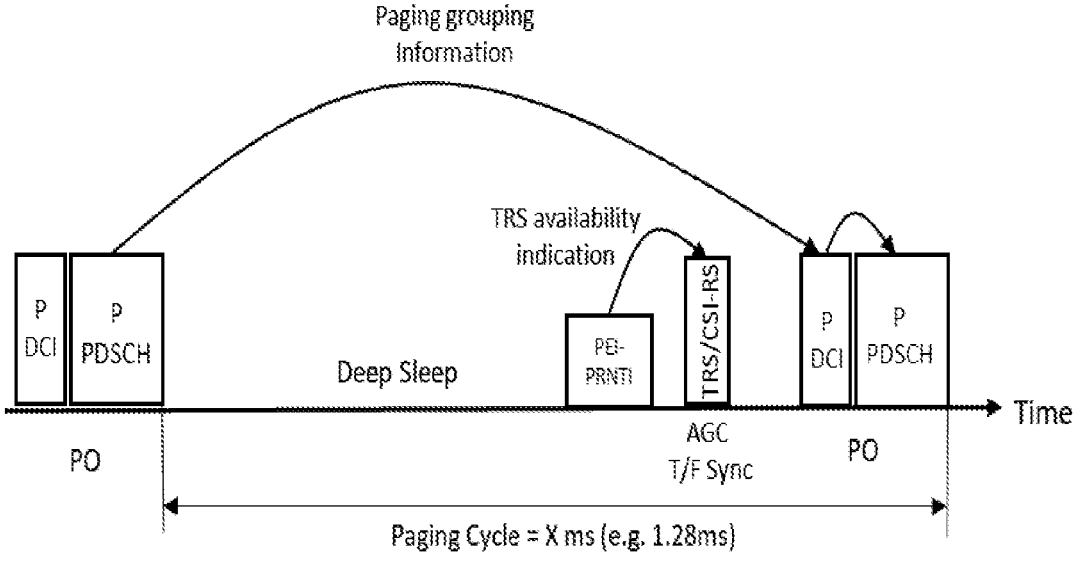
FIG. 17A is a schematic diagram illustrating an example of a hybrid L1 signaling of P-PDSCH based and dedicated P-DCI based PEI for prior indication of UE groups/sub-groups for paging and TRS/CSI-RS availability according to an embodiment of the present disclosure.
Figure 17B:
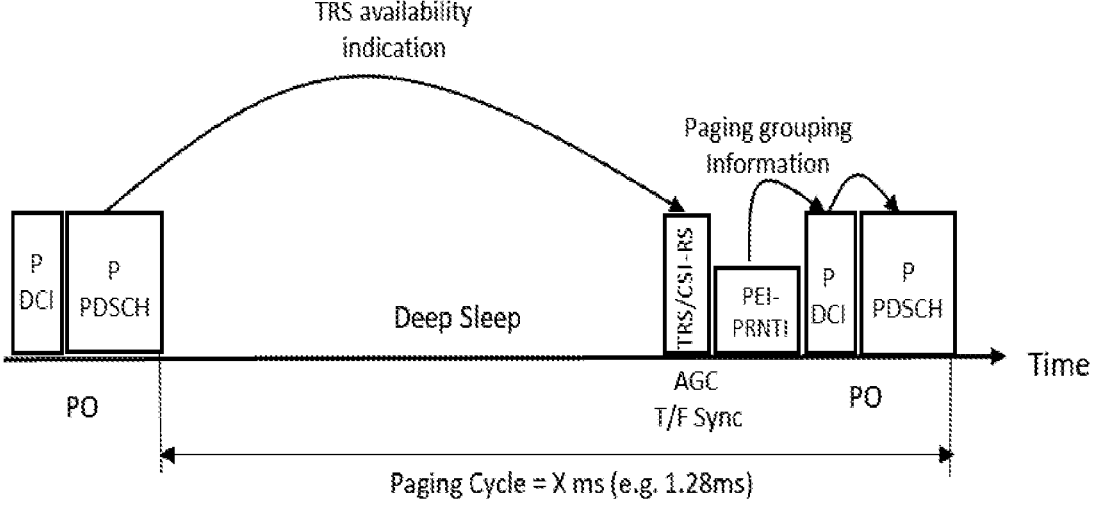
FIG. 17B is a schematic diagram illustrating an example of a hybrid L1 signaling of P-PDSCH based and dedicated P-DCI based PEI for prior indication of TRS/CSI-RS availability and UE groups/sub-groups for paging according to an embodiment of the present disclosure.

FIG. 17A illustrates an example of a hybrid L1 signaling of P-PDSCH based and dedicated P-DCI based PEI for prior indication of UE groups/sub-groups for paging and TRS/CSI-RS availability according to an embodiment of the present disclosure. FIG. 17B illustrates an example of a hybrid L1 signaling of P-PDSCH based and dedicated P-DCI based PEI for prior indication of TRS/CSI-RS availability and UE groups/sub-groups for paging according to an embodiment of the present disclosure. Similarly, a hybrid L1 signaling of a P-PDSCH based PEI and a dedicated P-DCI based PEI can be transmitted prior a PO to inform a UE group/sub-group information for paging according to the indication method explained in the above embodiments and indicate availability of TRS/CSI-RS according to the indication method explained in the above embodiments. This L1 hybrid signaling method has also two possible combinations. In the first combination, the P-PDSCH based PEI carries the UE group/sub-group information for paging and the dedicated P-DCI based PEI carries the TRS/CSI-RS availability indication as shown in FIG. 17A. In the second combination, the P-PDSCH based PEI carries the TRS/CSI- RS availability indication and the dedicated P-DCI based PEI carries the UE group/sub-group information for paging as shown in FIG. 17B.

Figure 18A:
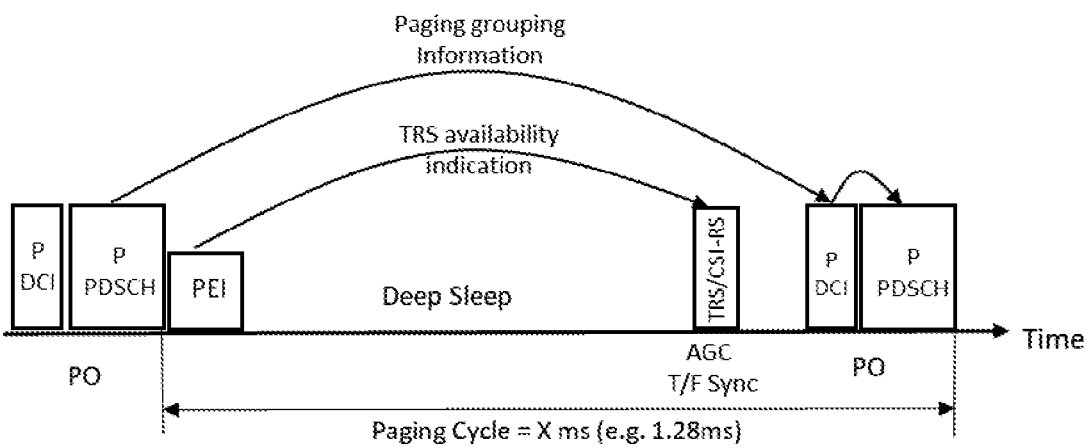
FIG. 18A is a schematic diagram illustrating an example of a hybrid L1 signaling of P-PDSCH and sequence based PEI for prior indication of UE groups/sub-groups for paging and TRS/CSI-RS availability according to an embodiment of the present disclosure.
Figure 18B:
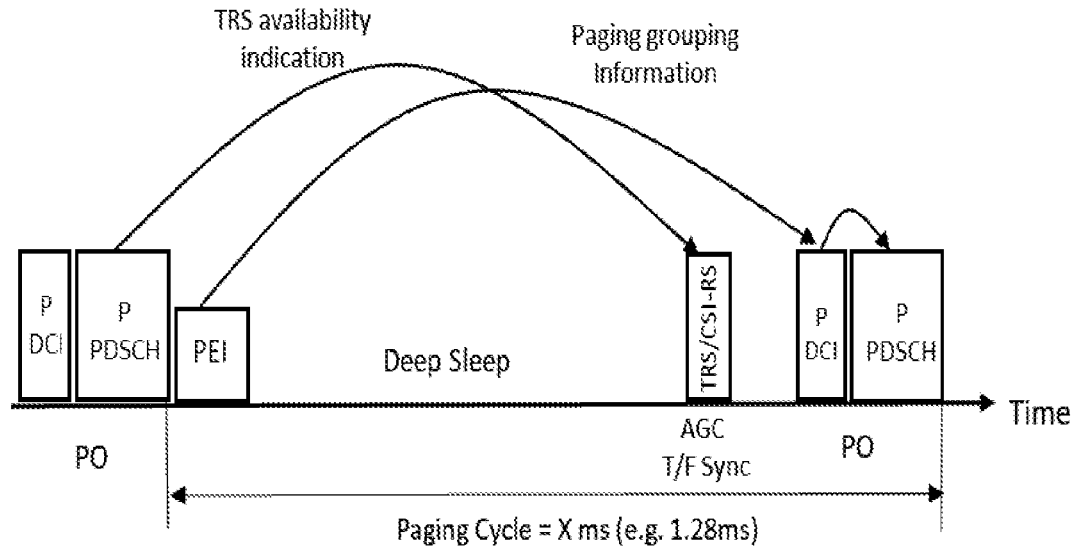
FIG. 18B is a schematic diagram illustrating an example of a hybrid L1 signaling of P-PDSCH and sequence based PEI for prior indication of TRS/CSI-RS availability and UE groups/sub-groups for paging according to an embodiment of the present disclosure.

Hybrid L1 Signaling of P-PDSCH and PEI:

FIG. 18A illustrates an example of a hybrid L1 signaling of P-PDSCH and sequence based PEI for prior indication of UE groups/sub-groups for paging and TRS/CSI-RS availability according to an embodiment of the present disclosure. FIG. 18B illustrates an example of a hybrid L1 signaling of P-PDSCH and sequence based PEI for prior indication of TRS/CSI-RS availability and UE groups/sub-groups for paging according to an embodiment of the present disclosure. In some embodiments, a hybrid L1 signaling comprising a P-PDSCH based PEI and a sequence based PEI is being transmitted prior a PO to inform UE groups/sub-groups for paging according to the indication method explained in the above embodiments and indicate the availability of TRS/CSI-RS according to the indication method explained in the above embodiments. This hybrid L1 signaling method has two possible combinations. In the first combination, the P-PDSCH based PEI carries the UE group/sub-group information for paging and the sequence based PEI carries the TRS/CSI-RS availability indication as shown in FIG. 18A. In the second combination, the P-PDSCH based PEI carries the TRS/CSI-RS availability indication and the sequence based PEI carries the UE group/sub-group information for paging as shown in FIG. 18B. It is understood that, in FIG. 6 to FIG. 18B, a PO starts from left to right. The left side PO is a first PO, and the right side PO is a next PO or called a second PO.

In summary, the main objectives of some embodiments are to reduce a network signaling overhead and avoid a blind detection complexity of TRS/CSI-RS decoding at the UE side by designing a shared L1 signaling for prior indication of both UE group/sub-group information for paging as well as TRS/CSI RS availability. The proposed solutions of some embodiments to achieve the objectives are summarized as below. 1. Three types of shared signaling for indication of both group/sub-group paging and TRS/CSI-RS availability have been considered: Sequence bases PEI L1 signaling, P-DCI based PEI L1 signaling, and P-PDSCH based PEI L1 signaling to reduce a signaling overhead and enhance power saving gain. 2. Two indication methods are used to differentiate functions of shared L1 signaling: Bitmap based indication which informs the UE group/sub-group information for paging and codes based indication which informs the availability of TRS/CSI-RS. 3. Each shared L1 signaling are partitioned into two section. The first section uses the bitmap based method to inform the UE group/sub-group information for paging and the second section uses code points based mapping to inform the availability of TRS/CSI-RS. In presence of code transmission, the UE will assume the availability of TRS/CSI-RS while in the absence of code transmission, the UE will assume the unavailability of TRS/CSI-RS. 4. Combinations of hybrid L1 signaling are proposed in which one signal carries the UE group/sub-group information for paging while the other signal carries the availability indication of TRS/CSI-RS.

In some embodiments, the design L1 signaling for carrying the prior indication of both UE group/sub-group information for paging as well as TRS/CSI-RS availability and have the following advantages: 1. Enhance power saving in an idle/inactive mode by using TRS/CSI-RS for AGC and T/F synchronization instead of using a legacy SSB. 2. Inform groups/sub-groups of UEs prior a PO to avoid an unnecessary UE wakeup. 3.

Consider prior indication of TRS/CSI-RS availability to the UE or groups/sub-groups of UEs to avoid a blind detection complexity of the UE for TRS/CSI-RS decoding. 4. Shared L1 signaling for indication of both UE group/sub-group information for paging and TRS/CSI-RS availability indication. 5. Reduce a network signaling overhead significantly. 6. Reduce a UE TRS/CSI-RS detection complexity as well as indication decoding complexity.

In the above, in some embodiments, carrying UE group/sub-group information for paging and prior indication of TRS/CSI-RS availability indication is considered in a physical layer design for paging enhancement. Without the proposed solutions of some embodiments, an independent physical layer signaling will be used for prior indication of UE group/sub-group information for paging and TRS/CSI availability. It will increase a physical layer signaling overhead at a network side and indication decoding complexity at a UE side. The proposed shared L1 signaling for carrying the UE group/sub-group information for paging and TRS/CSI-RS availability indication in some embodiments will reduce a network signaling overhead and UE's indication decoding complexity. Further, the proposed shared physical layer signaling, which uses unique indication methods for UE group/sub-group indication and TRS/CSI-RS availability indication, reduces the network signaling overhead as well as UE's indication decoding complexity.

Commercial interests for some embodiments are as follows. 1. Solving issues in the prior art. 2. Providing a UE grouping and TRS/CSI-RS indication for power saving. 3. Avoiding an unnecessary UE wakeup. 4. Avoiding a blind detection complexity of the UE for TRS/CSI-RS decoding. 5. Reducing a network signaling overhead, reduce a UE TRS/CSI-RS detection complexity and an indication decoding complexity. 6. Providing a good communication performance. 7. Providing a high reliability. 8. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure propose technical mechanisms.

Figure 19:
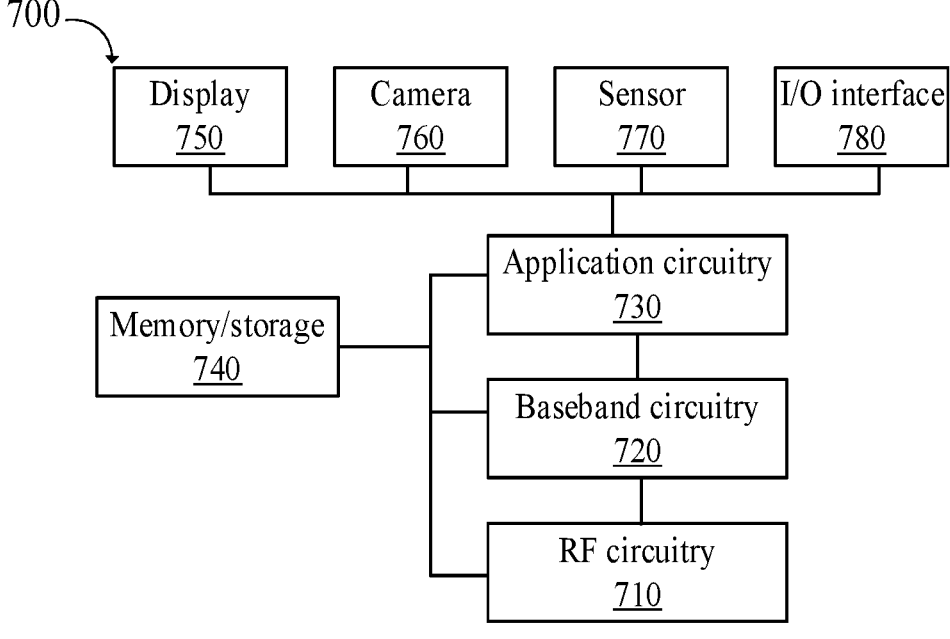
FIG. 19 is a block diagram of a system for wireless communication according to an embodiment of the present disclosure.

FIG. 19 is a block diagram of an example system 700 for wireless communication according to an embodiment of the present disclosure. Embodiments described herein may be implemented into the system using any suitably configured hardware and/or software. FIG. 19 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The first positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product.

The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method performed by a user equipment (UE) in a radio resource control (RRC) idle/inactive state, comprising:

being configured, by a base station, with a layer 1 (L1) signaling for paging early indication (PEI) before a paging occasion (PO), wherein the L1 signaling comprises a bits' field consisting of two sets, wherein the first set of bits' field indicates information of UE sub-groups for PO, and the first set of bits' field comprises a bitmap, wherein when the bitmap comprises a first value, the UE monitors the PO, and/or when the bitmap comprises a second value, the UE is not required to monitor the PO;

wherein the second set of bits' field indicates an availability indication of a tracking reference signal (TRS), and the second set of bits' field comprises bits codes, wherein when the bits codes comprise a first state, the UE is informed with an availability/presence of TRS, and/or when the bit codes comprise a second state, the UE is informed with an absence/unavailability of TRS;

wherein the L1 signaling of PEI starts with X slot gaps in time domain with the PO, where X is equal to 0 or an integer greater than 0.

2. The wireless communication method of claim 1, wherein the first set of bits' field of the L1 signaling carries information in a form of bitmap, to indicate the information of the UE sub-groups for paging before the PO.

3. The wireless communication method of claim 2, wherein each bit in a payload of the L1 signaling is associated to each sub-group.

4. The wireless communication method of claim 1, wherein the L1 signaling for PEI carrying the information in the form of bitmap to indicate the information of the UE sub-groups for paging before the PO uses a one-to-one mapping or a one-to-many mapping.

5. The wireless communication method of claim 4, wherein the one-to-one mapping is used in a case when a number of B bits in a payload of the L1 signaling is equal to or greater than a number of the UE sub-groups.

6. The wireless communication method of claim 5, wherein the B bits in the payload of the L1 signaling comprise 6 bits.

7. The wireless communication method of claim 4, wherein the one-to-many mapping is used in a case when each bit of B bits in a payload of the L1 signaling is associated to indicate multiple UE sub-groups for paging occasion.

8. The wireless communication method of claim 7, wherein the B bits comprise 4 bits, a number of the UE sub-groups is equal to 8, and each bit of B bits in the payload of the L1 signaling is associated to indicate 2 UE sub-groups for paging.

9. A wireless communication method performed by a base station, comprising:

configuring, to a user equipment (UE) in an RRC idle/inactive state, a layer 1 (L1) signaling for paging early indication (PEI) before a paging occasion (PO), wherein the L1 signaling comprises a bits' field consisting of two sets, wherein the first set of bits' field indicates information of UE sub-groups for PO, and the first set of bits' field comprises a bitmap, wherein when the bitmap comprises a first value, the PO is monitored, and/or when the bitmap comprises a second value, the PO does not need to be monitored;

wherein the second set of bits' field indicates an availability of a tracking reference signal (TRS), and the second set of bits' field comprises bit codes, wherein when the bit codes comprise a first state, the base station informs the UE of an availability/presence of TRS, and/or when the bit codes comprise a second state, the base station informs the UE of an absence/unavailability of TRS;

wherein the L1 signaling of PEI starts with X slot gaps in time domain with the PO, where X is equal to 0 or an integer greater than 0.

10. The wireless communication method of claim 9, wherein the first set of bits' field of the L1 signaling carries information in a form of bitmap, to indicate the information of the UE sub-groups for paging before the PO.

11. The wireless communication method of claim 10, wherein each bit in a payload of the L1 signaling is associated to each sub-group.

12. A user equipment (UE), comprising:

a memory;

a transceiver; and a processor coupled to the memory and the transceiver;

wherein the UE in an RRC idle/inactive state is configured to execute a wireless communication method comprising:

being configured, by a base station, with a layer 1 (L1) signaling for paging early indication (PEI) before a paging occasion (PO), wherein the L1 signaling comprises a bits' field consisting of two sets, wherein the first set of bits' field indicates information of UE sub-groups for PO;

wherein the first set of bits' field comprises a bitmap, wherein when the bitmap comprises a first value, the PO is monitored, and/or when the bitmap comprises a second value, the PO does not need to be monitored;

wherein the second set of bits' field indicates an availability indication of a tracking reference signal (TRS), and the second set of bits' field comprises bit codes, wherein when the bit codes comprise a first state, the base station informs the UE of an availability/presence of TRS, and/or when the bit codes comprise a second state, the base station informs the UE of an absence/unavailability of TRS;

wherein the L1 signaling of PEI starts with X slot gaps in time domain with the PO, where X is equal to 0 or an integer greater than 0.

13. The UE of claim 12, wherein the first set of bits' field of the L1 signaling carries information in a form of bitmap, to indicate the information of the UE sub-groups for paging before the PO.

14. The UE of claim 13, wherein each bit in a payload of the L1 signaling for PEI is associated to each sub-group.

15. The UE of claim 12, wherein the first set of bits' field of L1 signaling comprises a bitmap, wherein when the bitmap comprises a first value, the UE monitors the PO, and/or when the bitmap comprises a second value, the UE is not required to monitor the PO.

16. The UE of claim 15, wherein the L1 signaling for PEI carrying the information in the form of bitmap to indicate the information of the UE sub-groups for paging before the PO uses a one-to-one mapping or a one-to-many mapping.

* * * * *